United States Patent [19]
Kitazawa et al.

[11] Patent Number: 5,920,082
[45] Date of Patent: *Jul. 6, 1999

[54] LIQUID CRYSTAL DISPLAY DEVICE HAVING A TFT SWITCH COMPOSED OF A SEPARATE TRANSPARENT LAYER FOR CONNECTING THE PIXEL AND DRAIN ELECTRODES

[75] Inventors: Tomoko Kitazawa, Yokohama; Tetsuya Iizuka, Chigasaki; Takuya Shimano, Hyogo-ken, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/729,574

[22] Filed: Oct. 11, 1996

[30] Foreign Application Priority Data

Oct. 11, 1995 [JP] Japan ..................................... 7-263012

[51] Int. Cl.$^6$ .................................................. G02F 1/1333
[52] U.S. Cl. ............................... 257/59; 257/72; 349/42; 349/122; 349/138; 349/143
[58] Field of Search .............................. 349/122, 42, 138, 349/143; 257/59, 72

[56] References Cited

U.S. PATENT DOCUMENTS 5,500,750  3/1996  Kanabe et al. .......................... 349/138
5,523,865  6/1996  Furata et al. ............................. 349/130
5,585,951  12/1996  Noda et al. ............................. 349/122

FOREIGN PATENT DOCUMENTS 3-132626  6/1991  Japan .

Primary Examiner—Fetsum Abraham
Attorney, Agent, or Firm—Pillsbury Madison & Sutro

[57] ABSTRACT

An aperture rate of an active matrix substrate using TFTs can be improved, a short circuit can be prevent from being caused between a pixel electrode and a signal line, or a display defectiveness due to a coupling capacitor can be prevented, and display definition can be improved. A pixel electrode patterned by a back surface exposure technique is formed on a different surface by the presence of an insulating protection film. A source electrode and the pixel electrode are connected to each other by a first contact electrode formed of a transparent conductive film to be connected to a first contact hole formed through the insulating protection film. Since a connecting portion between the source electrode and the pixel electrode through the contact hole and a connecting portion between the pixel electrode and an auxiliary capacitor electrode are transparent conductive films, an aperture rate is not reduced. The pixel electrode and the signal line are formed on the different surface by the presence of the insulating protection film. As a result, no short circuit occurs therebetween. The defectiveness of points caused by the short circuit can be prevented from being generated.

9 Claims, 6 Drawing Sheets

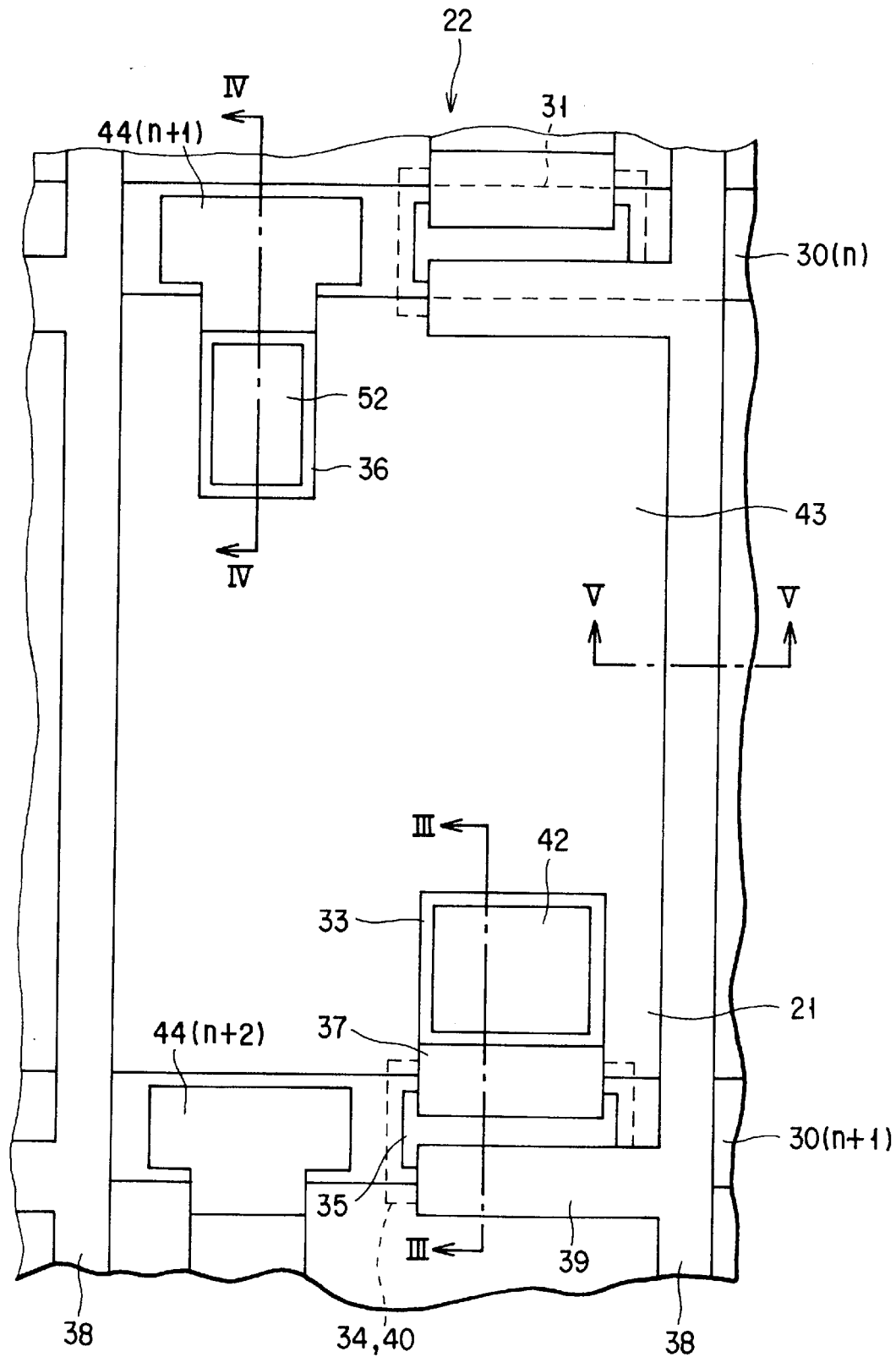
F I G. 1

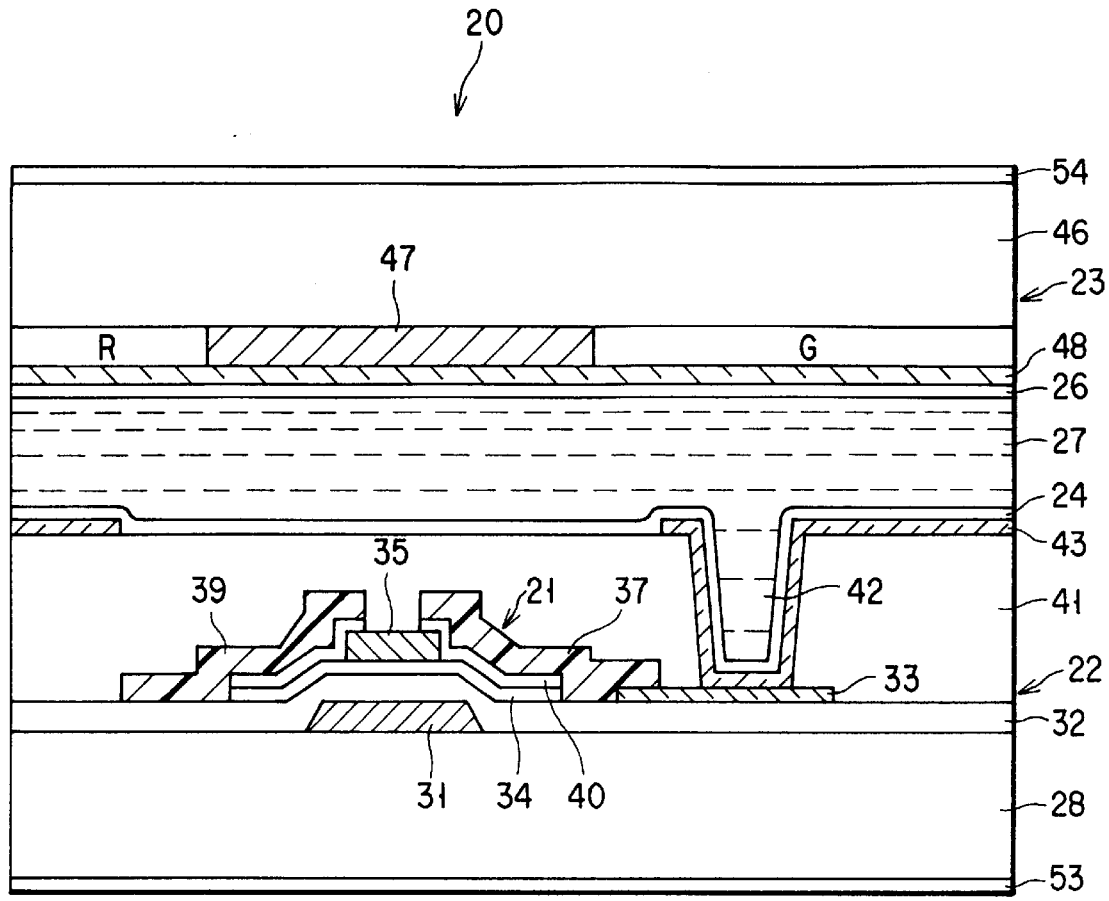
F I G. 2
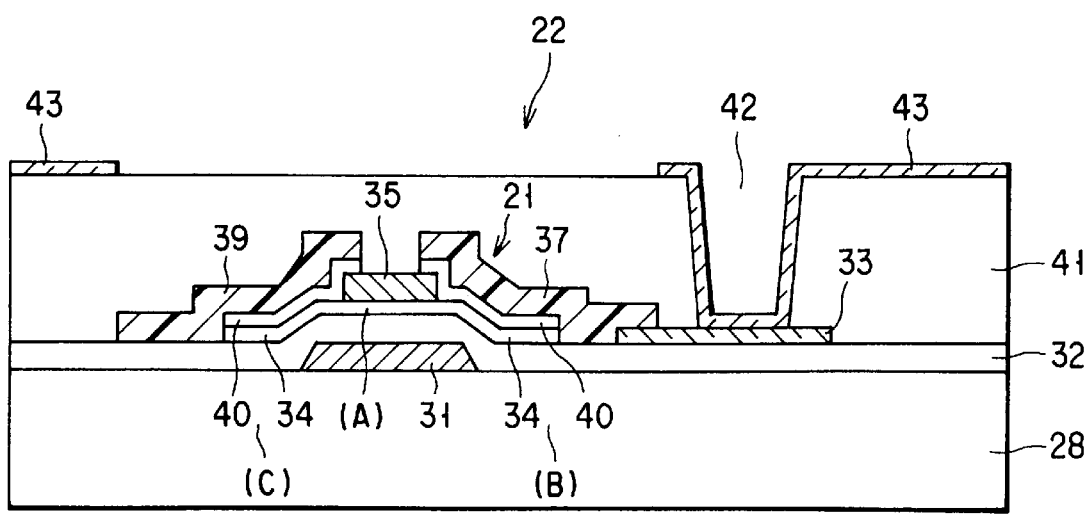
F I G. 3

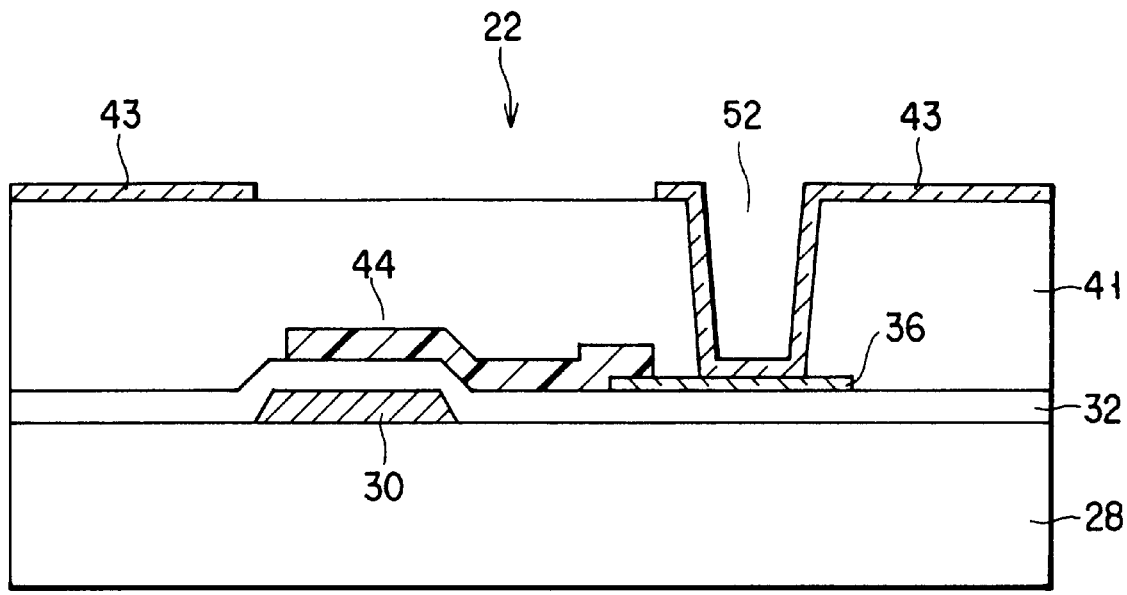
F I G. 4
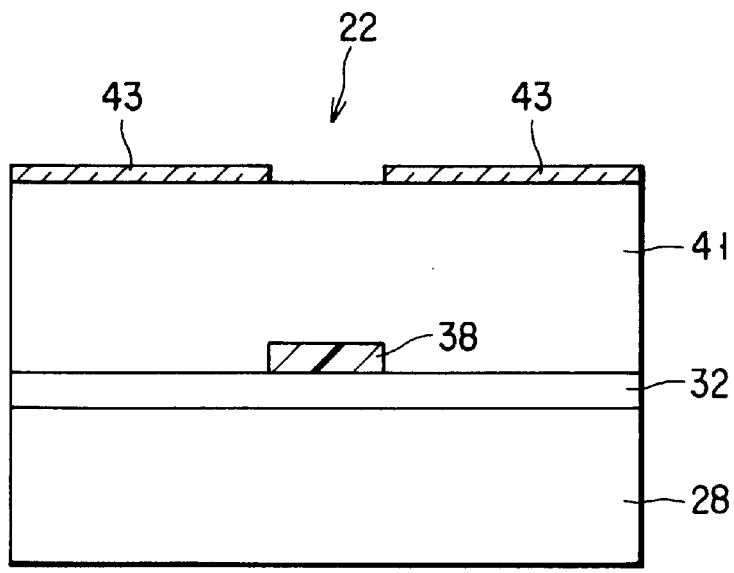
F I G. 5

LIQUID CRYSTAL DISPLAY DEVICE HAVING A TFT SWITCH COMPOSED OF A SEPARATE TRANSPARENT LAYER FOR CONNECTING THE PIXEL AND DRAIN ELECTRODES

BACKGROUND OF THE INVENTION

1. Field of the Invention

The present invention relates to an active matrix type liquid crystal display device having a plurality of thin film transistor driver elements and a liquid crystal member for displaying an image.

2. Description of the Related Art

A liquid crystal display (LCD) device, which has high density and large capacities, and which is capable of displaying an image at high speed with high resolution, is now widely used.

An active matrix type LCD (AM-LCD) device having thin film transistors (TFTS) as control elements are frequently used for the following reasons.

A display having a high contrast can be obtained without any crosstalk between adjacent pixels. Also, a transparent type display can be carried out, and a display area can be easily increased.

In the transparent type AM-LCD using an active matrix substrate (hereinafter called AM-plate) having TFTs as driver elements, a gate-insulating layer was formed on the AM-plate. A plurality of pixel electrodes were formed on the gate-insulating layer by photolithography. Moreover, a plurality of signal electrodes (signal lines) were formed on the gate-insulating layer to be on the same surface, the pixel electrodes having been formed by photolithography. Due to this, to compensate for a shift of a plurality of patterns formed on a photo resist layer at a pattern forming time, each outer periphery of the pixel electrodes was formed to be inside by 2 to 4 μm from each TFT and each line.

Particularly, there was a problem in that a pixel electrode voltage was leaked to the signal line due to increase in coupled capacitance between the signal electrode (signal line) and the pixel electrode. As a result, display definition was decreased. To prevent decrease in display definition, each of the outer periphery of the pixel electrode was formed to be several mm more inside from the above-mentioned state.

However, there occurred another problem in which an area for a pixel region was reduced, and an aperture ratio of the active matrix substrate, that is, the liquid display device was reduced.

Moreover, in the conventional case, to prevent a contrast ratio from being reduced by light leaking from the pixel electrode of the active matrix substrate, a black mask was formed on an opposite substrate. However, an accuracy of the position between the pixel electrode and the black mask depends on an assembly accuracy of an LCD cell (AM-plate and the opposite substrate are assembled). Then, a width of the black mask is largely set to allow an assembly accuracy of 6 to 10 μm. As a result, there is a problem in which the aperture ratio of the liquid crystal display device is further reduced if the above-mentioned structure is used.

For preventing display failure caused by a connection failure between a source electrode of TFT and the pixel electrode, a portion where both electrodes overlap with each other must be increased. However, in the conventional case, the source electrode is formed of transparent metal. Due to this, if the area of the overlapping portion is increased to make a sufficient contact between both electrodes, the aperture ratio is further decreased.

An amount of light transmission is decreased by the above-mentioned reduction of the aperture ratio, and luminance of the displayed screen is reduced. Then, if the luminance (amount of light) of a back light lamp is increased to ensure a predetermined luminance, power consumption is increased.

Moreover, in view of the structure of the above-mentioned active matrix substrate, there is the possibility in each of the pixel electrodes and each of the signal lines, which are formed on the same surface, of a short-circuit. For this reason, there is a problem in the occurrence of display defects, where "black points on the LCD cell do not disappear." That is, the pixel, which is positioned at a portion where the short-circuit occurs, maintains an ON state.

SUMMARY OF THE INVENTION

An object of the present invention is to provide a liquid crystal display device capable of reducing energy required for a back light lamp in the liquid crystal display device.

Another object of the present invention is to improve an aperture rate of the liquid crystal display device using an active matrix substrate having TFTs as driving elements so as to increase an amount of light transmission and luminance of a screen.

Moreover, another object of the present invention is to provide a liquid crystal display device that can prevent generation of point defects on a screen (generation of pixels in which an ON-state is maintained).

According to the present invention, there is provided an active matrix type liquid crystal display device comprising:

a thin film transistor having a gate formed on an insulating substrate to be connected to a scanning line, and a source and a drain spaced from each other and opposite to each other, the gate facing both the source and the drain sandwiching a semiconductor layer therebetween;

an interlayer insulating film formed to cover the source; and a transparent pixel electrode electrically connected to the source through a contact hole formed on the interlayer insulating film;

the source having an electrode region formed in the vicinity of the drain by the same process as the drain, and a transparent electrode region formed in the vicinity of the contact hole.

According to the present invention, a connecting portion between the source electrode and the pixel electrode through the contact hole and a connecting portion between the pixel electrode and an auxiliary capacitor electrode are transparent conductive films. As a result, an aperture rate is not reduced.

The pixel electrode and the signal line are formed on the different surfaces by the presence of the insulating protection film. As a result, no short circuit occurs therebetween. The point defects caused by the short circuit can be prevented from being generated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a partial schematic plane view showing an AM substrate to which an embodiment of the present invention is applied;

FIG. 2 is a partial schematic cross sectional view showing an LCD including the AM substrate of FIG. 1;

FIG. 3 is a schematic cross sectional view taken along a line III—III of the AM substrate of FIG. 1;

FIG. 4 is a schematic cross sectional view taken along a line IV—IV of the AM substrate of FIG. 1;

FIG. 5 is a schematic cross sectional view taken along a line V—V of the AM substrate of FIG. 1;

DETAILED DESCRIPTION OF THE PREFERRED EMBODIMENTS

Figure 6:
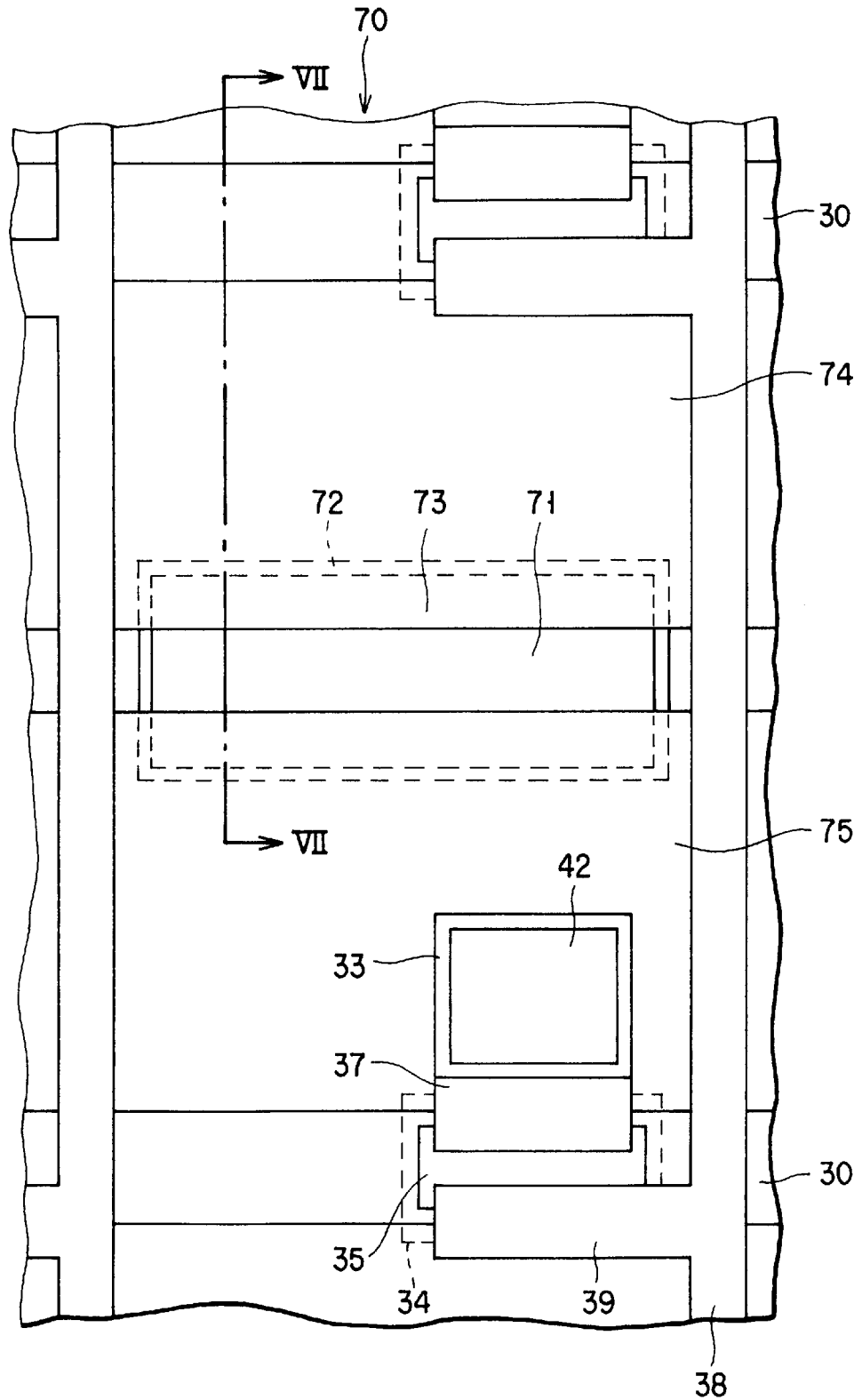
FIG. 6 is a partial schematic plane view showing another embodiment of the AM substrate of FIG. 1.

Embodiments of the present invention will be described with reference to the drawings.

FIGS. 1 to 5 are views showing an active matrix substrate to which the first embodiment of the present invention is applied, and a liquid crystal display device including the active matrix substrate.

As shown in FIGS. 1 to 5, an active matrix type liquid crystal display device (AM-LCD) 20 includes a plurality of thin film transistors (TFTS) 21 as driver elements, an active matrix substrate (AM substrate, first substrate) 22, and an opposite substrate (second substrate) 23. A plurality of alignment layers 24, 26 of polyimide are formed on an inner surface of each of the substrates 22 and 23. That is, the alignment layers 24 and 26 are formed by rubbing the surface. Nematic type liquid crystal 27 as a liquid crystal composition is injected between these alignment layers 24 and 26 of each of the substrates 22 and 23. Then, polarizing plates 53 and 54 are attached to outside portions of these substrates 22 and 23, respectively.

The active matrix substrate 22 has an insulating substrate 28 as transparent glass and a scanning line 30 formed on the insulating substrate 28. The scanning line 30 is formed of tantalum (Ta). The scanning line 30 is used to supply a scanning signal from an outer section. Also, the scanning line 30 is partially used as a gate electrode 31.

On the scanning line 30, the gate electrode 31, and an exposed portion of the AM substrate 28, there is formed a transparent gate-insulating film 32, made of oxide silicon (SiOx) having a predetermined thickness. The gate electrode 31 is coated with the gate-insulating film 32. On the gate-insulating film 32, a semiconductor layer 34 ((B) and (C)), an etching stopper layer 35 (A), and an n-type amorphous silicon (n-type a-Si) film (low resistance layer) are formed to be patterned. The semiconductor layer 34 includes an i-type hydrogenated amorphous silicon (i-type a-Si:H). The etching stopper layer 35 is formed of nitrogen silicon (SiNx).

The n-type a-Si film 40 is used to make a good ohmic connection. The semiconductor layer 34 ((B) and (C)) and the etching stopper layer 35 (A) constitute the TFT 21 functioning as a channel region (A), a source region (B), and a drain region (C).

On the gate-insulating film 32, first and second contact electrodes 33 and 36, made of indium tin oxide (ITO), are formed to be patterned.

Moreover, on the gate-insulating film 32, the first contact electrode 33, a source electrode 37, a signal line 38, a drain electrode 39 and an auxiliary capacitor electrode 44 are formed to be patterned. The source electrode 37 connects the first contact electrode 33 to the n-type a-Si film 40, which is connected to the source region (B). The drain electrode 39 connects the signal 38 to the n-type a-Si film 40, which branches from the signal line 38 to be connected to the drain region (C). The auxiliary capacitor electrode 44 is connected to a pixel electrode 43 through the second contact electrode 36. In this case, the auxiliary capacitor electrode 44 of nth+1 row is layered to sandwich the gate-insulating film 32 on the upper portion of a direction of a thickness of the scanning line of nth row. The auxiliary capacitor electrode 44 provides a storage capacitor CS at a portion between the electrode 44 and the gate-insulating film 32.

The above-mentioned patterns and the electrodes are coated with an insulating protection film 41 of SiNx. A first contact hole 42 and a second contact hole 52 are formed at a predetermined position of the insulating protection film 41. The first contact hole 42 connects the pixel electrode 43 and the first contact electrode 33 to each other. The second contact hole 52 connects the auxiliary capacitor electrode 44 and the second contact electrode 36 to each other.

On the insulating protection film 41, the pixel electrode 43 is formed. The pixel electrode 43 is formed of an ITO film, which is formed to be patterned by the same method as the self-alignment with the TFT 21, the scanning line 30, the signal line 38, the auxiliary capacitor electrode 44. The pixel electrode 43 is connected to the source electrode 37 through the first contact hole 42 and the first contact electrode 33. Also, the pixel electrode 43 is connected to the auxiliary capacitor electrode 44 through the second contact hole 52 and the second contact electrode 36.

The opposite substrate 23 includes an insulating substrate 46 of transparent glass, a black matrix (black mask) 47, and an opposite electrode 48. The black mask 47 is formed of shielding material such as chrome (Cr), which is patterned on the insulating substrate 46. The opposite electrode 48 has a color layer showing red (R), green (G), blue (B) to each region, and ITO. The black mask 47 prohibits light from being incident onto TFT 21, so that a light leak current generated from TFT 21 can be reduced.

Next, the following will explain a manufacturing method for AM-LCD 20.

In the active matrix substrate 22, Ta (tantalum) is film-formed on the insulating substrate 28 by sputtering. Then, a photo resist (not shown) is used as a mask, and Ta is etched by photolithography. As a result, the scanning line 30 and the gate electrode 31, which is part of the scanning line 30, are formed to be patterned.

Sequentially, the gate-insulating film 32, i-type Si:H film (semiconductor layer) 34, SiNx (protecting insulation) film 35 (etching stopper layer) are layered in order by plasma enhanced chemical vapor deposition (CVD).

Next, the SiNx film 32 and the i-type a-Si:H film 34 are etched, and the protection insulating film 35 and the semiconductor layer 34 are formed to be patterned.

Sequentially, the ITO film is formed on the gate insulating film 32 by sputtering, and the first and second contact electrodes 33 and 36 are etched by photolithography to be formed to be patterned.

Next, the n-type a-Si film 40 is formed on the semiconductor layer 34, and an aluminum (Al) film is deposited thereon to be etched. Then, the source electrode 37, the signal line 38 and the drain electrode 39, which is combined with the signal line 38, and the auxiliary capacitor electrode 44, are formed to be patterned, respectively.

Sequentially, the insulating protection film 41 of SiNx with a thickness of 0.8 to 1 μm is deposited thereon to be substantially flat in the vicinity of TFT 21. Then, the first and second contact holes 42 and 52 are formed at the positions corresponding to the first and second contact electrodes 33 and 36 so as to be etched.

Moreover, the ITO film is formed on the insulating protection film 41 by sputtering, and negative-type resist is applied onto the surface. Thereafter, the scanning line 30, the signal line 38, the source electrode 37, the drain electrode 39, and the auxiliary capacitor electrode 44 are used as a shielding mask to be exposed from the back surface of the insulating substrate 28. Thereby, the negative type resist is formed to be patterned. In this case, the portion, which is shielded by the exposure from the back face of the insulating substrate 28, is left as a pattern.

If the resist formed by the exposure from the back face is used as a mask to etch the ITO film, the ITO film is shaped to be self-aligned with the shielding material, so that the pixel electrode 43 is formed.

Thus, the active matrix substrate (first substrate, AM-plate) 22 is provided by a series of processes as mentioned above.

Next, the following will explain the opposite substrate 23. The opposite substrate 23 has the black mask 47. The black mask 47 is formed by etching chrome (Cr), which is film-formed on the substrate 46 to have a predetermined thickness. In this case, chrome (Cr) is etched to be island-shaped by photolithography. The black mask 47 is provided at a position, which is opposite to TFT 21 formed on the AM substrate 22. After coating the black mask 47 with a layer on which pigments are dispersed, a pattern exposure and development are repeated so as to form a strip region of each of three colors (red, green, blue) in predetermined order. Thereafter, the opposite electrode 48 of ITO is formed on the entire surface, which faces to the AM-substrate 22, thereby forming the opposite substrate 23.

Sequentially, the entire surface that faces the pixel electrode 43 of the active matrix substrate 22 (facing the opposite substrate) and the entire surface that faces the opposite electrode 48 of the opposite substrate 23 (facing to the active matrix substrate 22) are covered with the alignment layers 24, 26. Then, each of the alignment layers 24 and 26 are rubbed such that the axial direction of the alignment is set to 90°. Thereby, the substrates 22 and 23 are assembled to be opposite to each other. That is, nematic type liquid crystal 27 is injected between the substrates 22 and 23 so as to be sealed.

Next, the polarizing plates 53 and 54 are attached to the insulating substrates 28 and 46 (surfaces facing to the outside) of the substrates 22 and 23, respectively.

In the above-obtained active matrix substrate 22, the area of the pixel electrode 43 is about 1.3 times as large as that of the pixel electrode of the conventional device. Unlike the conventional device, it is unnecessary to define the aperture portion in the black matrix of the opposite substrate. The aperture ratio was increased to about 1.8 times as large as the conventional case.

As explained above, the first and second contact electrodes 33 and 36 are transparent. The pixel electrode 43 is formed by the exposure from the insulating substrate 28. Specifically, the scanning line 30, the signal line 38, the source electrode 37, the drain electrode 39, and the auxiliary capacitor electrode 44 are used as masks. The pixel electrode 43 is formed to be patterned to be self-aligned with these masks. As a result, it is unnecessary to form the pixel electrode to be smaller in consideration of the shift of resist, so that the light transmission area of the pixel electrode 43 can be increased.

Moreover, the aperture portion becomes substantially the same as the area of the pixel electrode 43 defined by the line of the shielding material or the electrode pattern. As a result, the aperture ratio of the active matrix substrate 22 can be improved, and the screen luminance of the AM-LCD 20 can be improved. The luminance (amount of light) of the back light lamp can be reduced so as to decrease consumption power.

The source electrode 37 and the first contact electrode 33, which is a connecting portion to the pixel electrode 43, are transparent. For this reason, even if the source electrode 37 and the first contact electrode 33 are enlarged, the aperture ratio of the AM-LCD 20 is not reduced.

The pixel electrode 43 and the signal line 38 are formed on the different surface by the presence of the insulating protection film 41. As a result, no short circuit occurs between the signal line 38 and the pixel electrode 43. The defectiveness of black points which is caused by the short circuit can be prevented. Moreover, since the insulating protection film 41 is sufficiently thick, the coupling capacity between the signal line 38 and the pixel electrode 43 is reduced, so that the uniform display having no crosstalk can be obtained.

Figure 7:
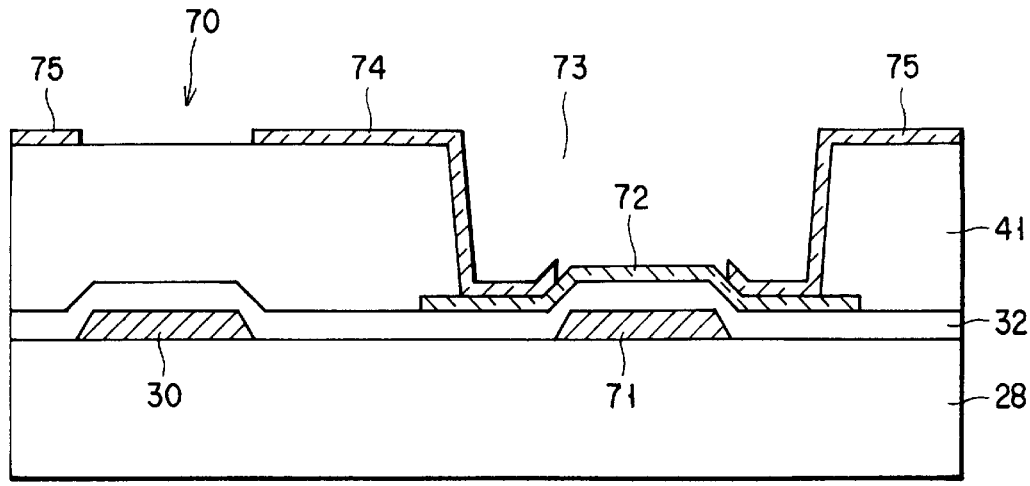
FIG. 7 is a schematic cross sectional view taken along a line VII—VII of the AM substrate of FIG. 6.

FIGS. 6 and 7 show a second embodiment of the present invention. In this embodiment, an auxiliary capacitor line is formed at a position, which is independent of the scanning line. In FIGS. 6 and 7, the same reference numerals as the case of FIGS. 1 to 5 are added to the same structure as the structure shown in FIGS. 1 to 5, and the explanation will be omitted.

On an active matrix substrate 70, the scanning line 30 and an auxiliary capacitor line 71, which is formed of the same material as the scanning line, are simultaneously formed to be patterned. In this case, the auxiliary capacitor line 71 is positioned not to be overlapped with the scanning line 30.

The gate insulating film 32 is formed on the auxiliary capacitor line 71, and the first contact electrode 33 of the ITO film and the second contact electrode 72 are formed to be patterned.

The insulating protection film 41 is formed on these electrodes. After forming the insulating protection film 41, first and second contact holes 42 and 73 are formed thereon.

Moreover, pixel electrodes 74 and 75 of ITO are formed thereon, and they are connected to each other through the second contact hole 73 and the contact electrode 72. A portion where the pixel electrode 74 and the auxiliary capacitor line 71 overlap with each other functions as an auxiliary capacitor Cs.

According to the above-mentioned structure, similar to the conventional case, the auxiliary capacitor line is formed separately from the scanning line. In addition, the area of the pixel electrode can be enlarged, and the aperture rate can be improved as compared with the conventional case.

Figure 9:
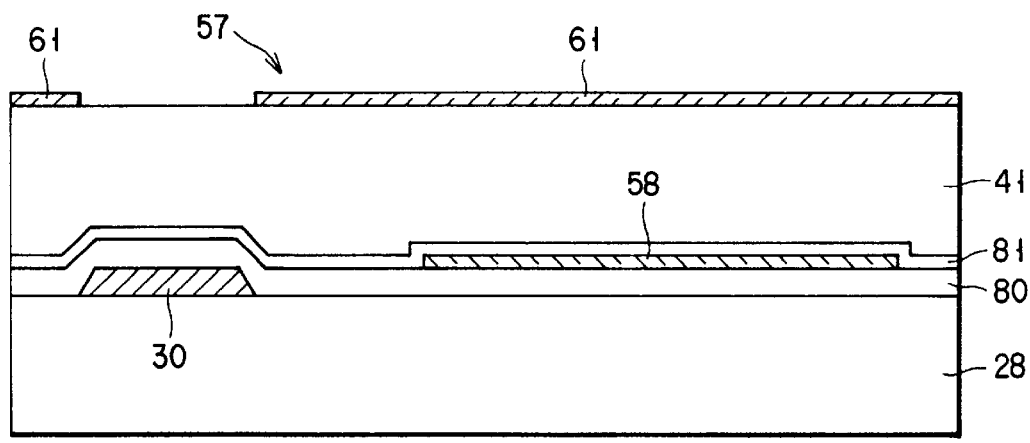
FIG. 9 is a schematic cross sectional view taken along a line IX—IX of the AM substrate of FIG. 8.
Figure 8:
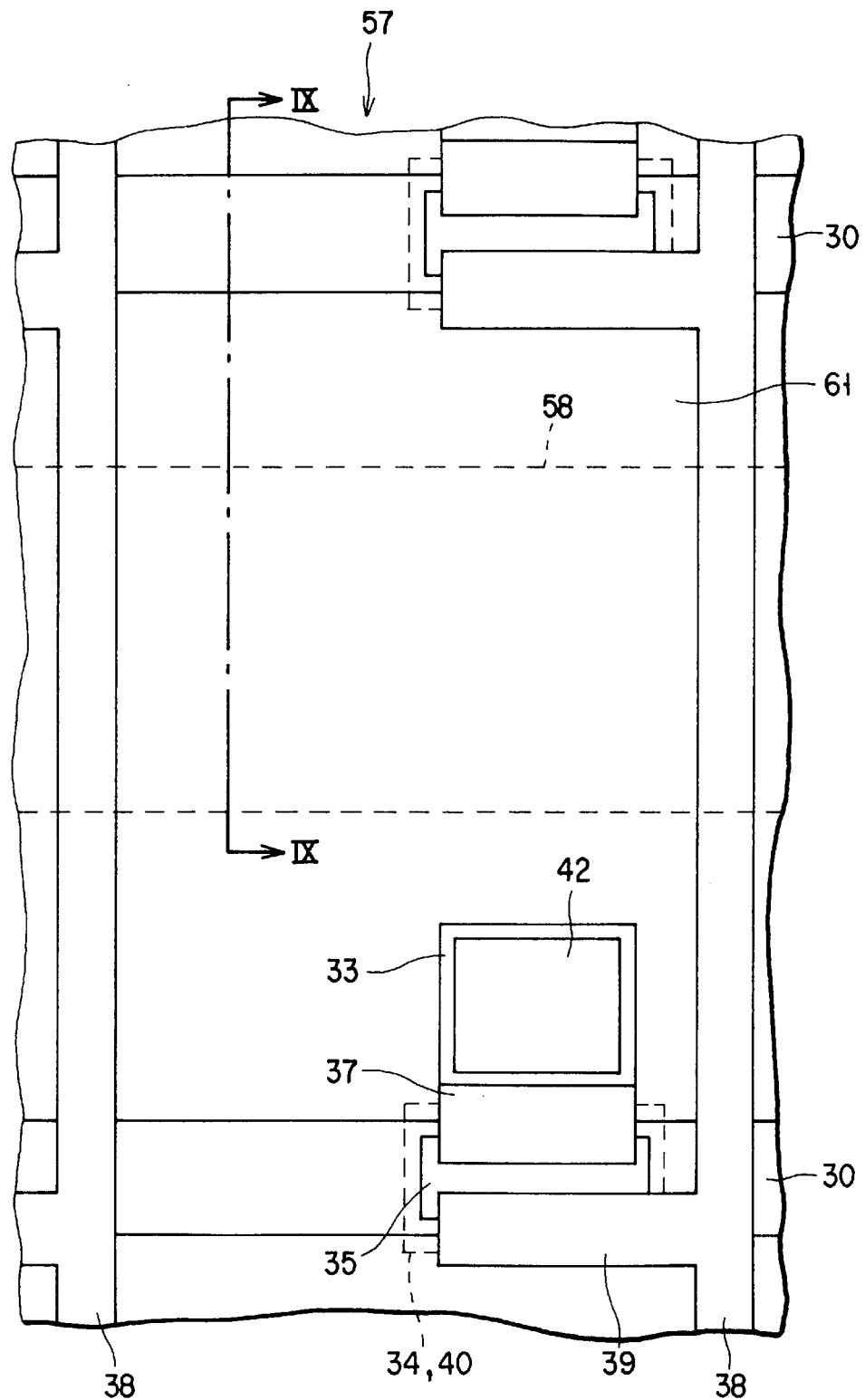
FIG. 8 is a partial schematic plane view showing further another embodiment of the AM substrate of FIG. 1.

FIGS. 8 and 9 show a third embodiment of the present invention. In this embodiment, the gate insulating film is double-plated, and an auxiliary capacitor line of ITO, which is a transparent conductive film, is formed between two gate insulating films to be independent of the scanning line. In FIGS. 8 and 9, the same reference numerals as the case of FIGS. 1 to 5 are added to the same structure as the structure shown in FIGS. 1 to 5, and the explanation will be omitted.

An active matrix substrate 57 has an auxiliary capacitor line 58 formed on a first gate insulating film 80. The auxiliary capacitor line 58 is formed of ITO. The auxiliary capacitor line 58 is formed to be patterned at a portion where the auxiliary capacitor line 58 and the scanning line 30 are not overlapped with each other. The auxiliary capacitor line 58 is formed to be patterned before the first contact electrode 33 is formed.

A second gate insulating film 81 and the insulating protection film 41 are layered in a direction of a thickness of each of the auxiliary capacitor line 58 and the scanning line. On the insulating protection film 41, a pixel electrode 61 is formed to be patterned by the back surface exposure technique.

The auxiliary capacitor is formed on a portion where the second gate insulating film 81, the auxiliary capacitor line 58, and the pixel electrode 61 are overlapped one another through the insulating protection film 41.

According to the above-mentioned structure, even if the auxiliary capacitor line is sufficiently largely provided to be independent of the scanning line, the pattern forming is not prevented by the auxiliary capacitor line since the auxiliary capacitor line is transparent. Similar to the case shown in FIGS. 1 to 5, the area of the pixel electrode can be enlarged and the aperture rate can be improved as compared with the conventional case. Moreover, the pixel electrode can be flat formed excepting the surroundings of the first contact electrode, and the alignment of liquid crystal can be improved.

Figure 10:
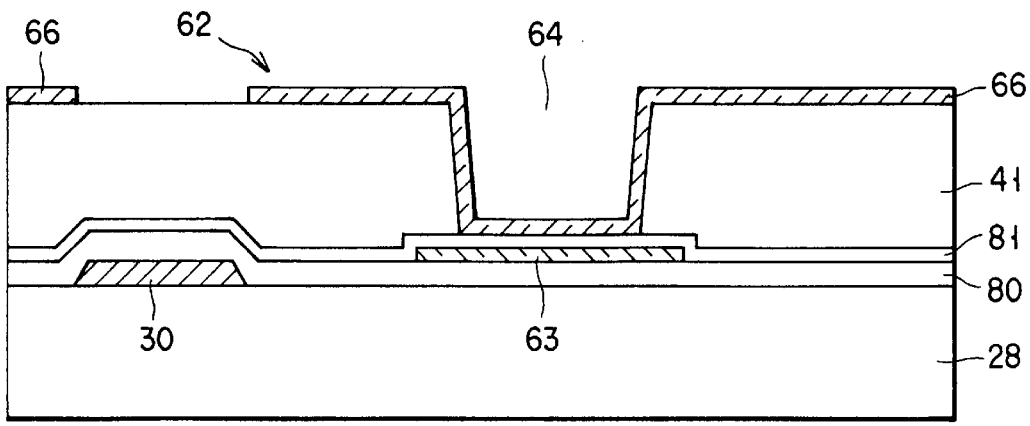
FIG. 10 is a partial schematic plane view showing further another embodiment of the AM substrate of FIG. 1.

FIG. 10 shows a fourth embodiment of the present invention. In this embodiment, the gate insulating film is double-layered. An auxiliary capacitor line of ITO, which is a transparent conductive film, is formed between two gate insulating films to be independent of the scanning line. A contact hole is formed on the insulating protection film positioned at the upper portion of the auxiliary capacitor line. In FIG. 10, the same reference numerals as the case of FIGS. 1 to 5 are added to the same structure as the structure shown in FIGS. 1 to 5, and the explanation will be omitted.

An active matrix substrate 62 has an auxiliary capacitor line 63 formed on the first gate insulating film 80. The auxiliary capacitor line 63 is formed of ITO. On the auxiliary capacitor line 63, the second insulating film 81, and the insulating protection film 41 are formed. A contact hole 64 is formed on the insulating protection film 41 positioned at the upper portion of the auxiliary capacitor line.

On the insulating protection film 41, a pixel electrode 66 is formed to be patterned by the back surface exposure technique.

As a result, an auxiliary capacitor is formed on a portion where the auxiliary capacitor line 63 and the pixel electrode 66 are overlapped with each other through the second gate insulating film 81.

According to the above-mentioned structure, similar to the case shown in FIGS. 8 and 9, since the auxiliary capacitor line 63 is transparent, the pattern forming is not prevented by the auxiliary capacitor line 63, and the area of the pixel electrode can be enlarged.

By the formation of the contact hole 64, the distance between the auxiliary capacitor line 63 and the pixel electrode 66 is reduced as compared with the example shown in FIGS. 8 and 9. As a result, even if the width of the auxiliary capacitor line 63 is narrowed, the same auxiliary capacitor as the case of FIGS. 6 and 7 can be obtained.

The invention in its broader aspect is not limited to the specific details and representative devices shown and described herein. Accordingly, various modifications may be made without departing from the spirit or scope of the general inventive concept as defined by the appended claims and their equivalents.

For example, the material of each of the gate electrode, the scanning line, the signal line, the gate insulting line, the insulating protection film may be arbitrarily selected. Moreover, the shape of each of the scanning line and the gate electrode is not limited. For example, instead of using the part of the scanning line as the gate electrode as in the first embodiment, the gate electrode may be projected to be branched from the scanning line.

In addition, the scanning line, signal line and pixel electrode may not be formed by the self-alignment method. Instead, the scanning line or signal line may overlap a peripheral portion of the pixel electrode, as viewed in cross section.

The black matrix may be formed at not the side of the opposite substrate but the side of the active matrix substrate. The area of the black matrix can be reduced to a minimum regardless of the accuracy of the assembly of the liquid crystal cell. Also, the aperture rate of the liquid crystal display device can be further improved. In addition, the material of the black matrix and the forming method may be arbitrarily selected.

As mentioned above, according to the present invention, the pixel electrode is formed by the exposure from the insulating substrate. The wiring and the electrodes, which are formed of the shielding materials, are used as masks. The pixel electrode is formed to be patterned to be self-aligned with these masks. As a result, it is unnecessary to consider the shift of resist caused at the pattern forming time by the conventional lithography. As a result, the area of the pixel electrode 43 can be increased, and the aperture rate of the AM substrate 22. Moreover, the screen luminance of AM-LCD can be improved, and the power consumption for back-light can be reduced.

The pixel electrode and the signal line are formed on the different surface by the presence of the insulating protection film. As a result, no short circuit occurs between the signal line and the pixel electrode. The defectiveness of black points, which is caused by the short circuit, can be prevented from being generated. Moreover, the coupling capacity between the signal line and the pixel electrode is reduced, so that the uniform display having no crosstalk can be obtained, and the display definition can be improved.

As explained above, there is provided an active matrix type LCD comprising an active matrix substrate having pixel electrodes arranged on a transparent insulating substrate in a matrix form, an opposite substrate having an opposite electrode opposite to the active matrix substrate, and a liquid crystal composition injected between the active matrix substrate and the opposite substrate, wherein the active matrix substrate comprises an active layer formed on an upper portion of a gate electrode through a gate insulating film, a plurality of TFTs, arranged in a matrix form, having a drain electrode and a source electrode provided to sandwich the active layer therebetween, a plurality of scanning lines, formed of shielding material and connected to the gate electrode, for supplying a scanning signal, a transparent insulating protection film for coating the TFTs, the scanning lines, and the signal line, and a pixel electrode, provided on the insulating protection film, using all shielding materials coated with the insulating protection film as masks, and the pixel electrode formed to be patterned to be self-aligned with these masks, and a part of the pixel electrode connected to the source electrode.

According to the present invention, the pixel electrode is formed on the insulating protection film. By the back surface exposure, TEF, the scanning line, and the signal line, are formed of the shielding materials, so as to be used as masks. The pixel electrode is formed to be patterned to be self-aligned with these masks. As a result, the area of the pixel electrode can be increased, and the aperture rate of the AM substrate, that is, the screen luminance can be improved, and the power consumption for back-light can be saved.

The connecting portion between the source electrode and the pixel electrode, and the connecting portion between the pixel electrode and the auxiliary capacitor electrode are transparent conductive films. For this reason, the aperture ratio is not reduced.

The pixel electrode and the signal line are formed on the different surface by the presence of the insulating protection film. As a result, no short circuit occurs between the signal line and the pixel electrode. The defectiveness of black points, which is caused by the short circuit, can be prevented.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An active matrix type liquid crystal display device comprising:

an insulating substrate (28), a plurality of scanning lines (30) extending in a first direction and a plurality of signal lines (38) extending in a second direction, said scanning lines and said signal lines being formed on said insulating substrate and said signal lines crossing said scanning lines at a plurality of crossing locations;

a plurality of thin film transistor units each associated with a respective one of said crossing locations, when a respective scanning line crosses a respective signal line, each said transistor unit comprising:

a semiconductor layer (34);

a gate electrode (31) connected to the respective scanning line;

a gate insulating film (32) interposed between said semiconductor layer and said gate electrode;

a source electrode (37) and a drain electrode (39) which are separated from one another and are both connected to said semiconductor layer, said drain electrode being connected to the respective signal line and said source electrode and drain electrode both being made of the same material;

a transparent first contact electrode (33) connected to said source electrode, said first contact electrode being separated from semiconductor layer along a plane containing at least a portion of said semiconductor layer;

an insulating protection film (41) covering said source electrode and said first contact electrode, said protection film having a contact hole (42) which opens on a portion of said first contact electrode; and a transparent pixel electrode (43) located on said protection film and electrically connected to said first contact electrode via said contact.

2. The device according to claim 1 wherein said transparent pixel electrode overlaps at least one of said respective scanning line and said respective signal line.

3. The device according to claim 1 wherein said transparent pixel electrode is self-aligned with said respective scanning line and said respective signal line.

4. The device according to claim 1 wherein each said transistor unit further comprises an auxiliary capacitor electrode (44) disposed above said respective scanning line and spaced from said respective scanning line by said gate insulating film, and wherein said insulating protection film has a second contact hole (52) via which said transparent pixel electrode is connected to said auxiliary capacitor electrode.

5. The device according to claim 4 further comprising a second contact electrode (36) formed on the same surface, and made of the same material, as said first contact electrode, said second contact electrode being overlapped by a portion of said transparent pixel electrode.

6. The device according to claim 5 wherein said insulating protection film has upper and lower surfaces and said second contact electrode is formed directly at the lower surface of said insulating protection film.

7. The device according to claim 4 wherein each said transistor unit further comprises a channel formed on said respective scanning line, and wherein said auxiliary capacitor electrode is separated from said scanning line by said gate insulating film, and is located at a position adjacent said channel.

8. The device according to claim 1 further comprising, in association with each of said thin film transistor units:

an auxiliary capacitor line (71) formed on the same surface as said respective scanning line;

and a second contact electrode (72) formed on the same surface, and made of the same material, as said first contact electrode, and wherein said insulating protection film has a further contact hole via which said transparent pixel electrode is connected to second contact electrode.

9. The device according to claim 1 wherein each said thin film transistor unit further comprising a shielding layer disposed to shield a channel of said thin film transistor unit.

* * * * *